US00RE40123E

(19) United States
(12) Reissued Patent
Johansen et al.

(10) Patent Number: US RE40,123 E
(45) Date of Reissued Patent: Mar. 4, 2008

(54) REMOVAL OF HEAT AND WATER VAPOR FROM COMMERCIAL DISHWASHING MACHINES

(75) Inventors: Scott A. Johansen, Minneapolis, MN (US); Kent R. Brittain, Ellsworth, WI (US); Lee J. Monsrud, Inver Grove, MN (US); Glen W. Davidson, Roseville, MN (US)

(73) Assignee: Ecolab Inc., St. Paul, MN (US)

(21) Appl. No.: 10/339,862

(22) Filed: Jan. 9, 2003

Related U.S. Patent Documents

Reissue of:
(64) Patent No.: 6,170,166
Issued: Jan. 9, 2001
Appl. No.: 09/114,015
Filed: Jul. 10, 1998

(51) Int. Cl.
*F26B 19/00* (2006.01)

(52) U.S. Cl. ..... 34/62; 34/68; 34/69; 34/79; 34/84; 34/595

(58) Field of Classification Search ..... 34/337, 34/340, 343, 372, 381, 403, 417, 469, 430, 34/60, 61, 62, 68, 69, 76, 79, 84, 26, 130, 34/595, 596; 68/5 C, 5 D, 5 E, 19, 20; 239/290, 239/597, 601; 62/304, 259.4, 314; 134/56 D
See application file for complete search history.

(56) References Cited

U.S. PATENT DOCUMENTS

| | | | |
|---|---|---|---|
| 240,404 | A | 4/1881 | Gibbs |
| 1,664,637 | A | 4/1928 | Merseles et al. |
| 1,720,622 | A | 7/1929 | Breton |
| 2,770,242 | A | 11/1956 | Tubiolo |
| 2,949,120 | A | 8/1960 | Federighi et al. |
| 2,988,094 | A | 6/1961 | Ludwick et al. |
| 3,034,933 | A | 5/1962 | Richards |
| 3,038,709 | A | 6/1962 | McDonald |
| 3,337,896 | A | 8/1967 | Allen |
| 3,598,131 | A | 8/1971 | Weibe, Jr. |

(Continued)

FOREIGN PATENT DOCUMENTS

| | | |
|---|---|---|
| CH | 391 216 | 8/1965 |
| DE | 128108 A | 8/1978 |
| DE | 3345603 A1 | 7/1985 |
| DE | 3513639 A1 | 10/1986 |
| DE | 3515592 A1 | 11/1986 |
| DE | 3538305 A1 | 4/1987 |
| DE | 195 22 307 A1 | 1/1997 |
| EP | 0000192 A1 | 1/1979 |
| EP | 0 486 828 A1 | 5/1992 |
| EP | 0 521 815 A1 | 1/1993 |
| EP | 0 721 762 A1 | 7/1996 |
| EP | 0 753 282 A1 | 1/1997 |
| EP | 0 793 940 A1 | 9/1997 |
| EP | 0 800 786 A1 | 10/1997 |
| EP | 0 970 654 A1 | 1/2000 |
| FR | 2337536 A | 9/1977 |
| FR | 2491322 A | 4/1982 |
| GB | 1245570 | 9/1971 |
| JP | 0 813 1391 A | 5/1996 |
| JP | 0 822 4201 A | 9/1996 |
| SU | 1655460 A1 | 6/1991 |

*Primary Examiner*—Stephen Gravini
(74) *Attorney, Agent, or Firm*—Kagan Binder, PLLC

(57) ABSTRACT

A water-driven jet or venturi extraction means is used to remove, capture and cool the hot, highly humid air created within commercial dishwashers during a wash rinse or sanitization cycle. A cold water spray is used to create a pressure reduction zone which serves to draw in hot, highly humid air from the dishwasher. Water vapor cools and condenses on contact with the cold water spray within the venturi. The invention also serves to help vent the dishwasher. Cool, fresh air is drawn into the dishwasher while the hot air is drawn into the venturi.

34 Claims, 2 Drawing Sheets

U.S. PATENT DOCUMENTS

| | | | | |
|---|---|---|---|---|
| 3,658,075 | A | | 4/1972 | Jacobs |
| 3,664,255 | A | | 5/1972 | Kuechler |
| 3,789,860 | A | | 2/1974 | Katterheinrich et al. |
| 3,876,469 | A | | 4/1975 | Schimke |
| 4,043,319 | A | | 8/1977 | Jensen |
| 4,098,616 | A | | 7/1978 | Dorius et al. |
| 4,266,528 | A | | 5/1981 | Barnhart et al. |
| 4,268,973 | A | | 5/1981 | Jezuit et al. |
| 4,272,462 | A | | 6/1981 | Butt |
| 4,536,198 | A | | 8/1985 | Strain |
| 4,610,705 | A | | 9/1986 | Sarnosky et al. |
| 4,709,488 | A | | 12/1987 | Anselmino et al. |
| 4,805,649 | A | | 2/1989 | Nezworski |
| 4,902,316 | A | | 2/1990 | Giles, Sr. et al. |
| 4,938,240 | A | | 7/1990 | Lakhan et al. |
| 5,038,807 | A | | 8/1991 | Bailey et al. |
| 5,042,171 | A | * | 8/1991 | Obata et al. ..... 34/604 |
| 5,056,542 | A | | 10/1991 | Reinhard |
| 5,056,543 | A | | 10/1991 | Dygve |
| 5,123,481 | A | | 6/1992 | Albers et al. |
| 5,173,258 | A | | 12/1992 | Childers |
| 5,186,912 | A | | 2/1993 | Steindorf et al. |
| 5,207,764 | A | | 5/1993 | Akabane et al. |
| 5,267,580 | A | | 12/1993 | Payzant |
| 5,282,901 | A | | 2/1994 | Reinhard |
| 5,375,421 | A | | 12/1994 | Hsieh |
| 5,443,624 | A | | 8/1995 | Claesson |
| 5,497,798 | A | * | 3/1996 | Fritz et al. ..... 134/151 |
| D376,003 | S | | 11/1996 | Hansen et al. |
| 5,598,719 | A | * | 2/1997 | Jones et al. ..... 62/304 |
| 5,769,067 | A | | 6/1998 | Mandeville et al. |
| 6,170,166 | B1 | | 1/2001 | Johansen et al. |

* cited by examiner

REMOVAL OF HEAT AND WATER VAPOR FROM COMMERCIAL DISHWASHING MACHINES

Matter enclosed in heavy brackets [ ] appears in the original patent but forms no part of this reissue specification; matter printed in italics indicates the additions made by reissue.

FIELD OF THE INVENTION

The invention relates to a method and apparatus for venting gaseous, vaporous and airborne particulate material from, and cooling the inside, of processing equipment or machinery. In particular, the invention relates to the removal of heated air laden with water vapor from within commercial warewashing or dishwashing machines.

BACKGROUND OF THE INVENTION

Commercial automated dishwashers have been used for many years in a variety of different locales, wherever large amounts of cookware, silverware, dishware, glasses or other ware need to be cleaned and sanitized. Regardless of whether the dishwasher in question is a simple batch loading dishwasher or a complex multi-stage machine, there is an on-going problem with heated water vapor escaping the machine at the end of a cleaning program. This heat and humidity comes into direct contact with the kitchen personnel and generally reduces comfort of the kitchen environment. Commercial dishwashing machines can heat water or utilize very hot water from other sources, especially in the final rinse stage, to help ensure cleaning and sanitation. Current dishwashers are classified as either high temperature machines or as low temperature machines, based on final rinse water temperatures. The high temperature machines have a final rinse water temperature of at least about 180° F. while the low temperature machines have a final rinse water temperature of about 160° F. Such high temperatures are necessary to ensure adequate sanitization of the dishes or other ware being cleaned. The high temperature rinse allows for one-step sanitization whereas the low temperature rinse is typically accompanied by an additional chemical (chlorine, peracid, etc.) sanitization addition step. In either situation, hot ware and significant volumes of heated, highly humidified air are created in the dishwasher, particularly as a result of the final rinse, which is typically the hottest step in the dish or warewashing process.

Direct contact with hot, humid air can pose safety problems. The humidity causes significant safely problems for people who wear glasses and/or contact lenses. The hot, humid air can irritate people without eyewear as well. Significant amounts of heated water vapor are put into the room environment, straining air conditioning systems and generally creating discomfort for operators. Further, the dishes removed from the dishwasher can be at high temperature.

One way to address these difficulties concerns the use of vent hoods to capture the hot, highly humid air escaping from the dishwasher upon opening. A drawback to this method is that the hot, highly humid air contacts environmental air in the use locus and the hood removes only a portion. As a result, some heat and humidity is transferred to the immediate environment. While the hood will draw the hot, highly humid air up and away from the dishwasher, it may fail to completely protect the operator from contact with heat and humidity. In addition, hoods are large, noisy and expensive, wasting heat during winter months, and conditioned air in summer months. Further, such a system requires venting to the exterior of the building. Another way to address these problems concerns the use of electric exhaust fans to remove the heat and water vapor. Unfortunately, this is noisy, requires electricity and means to vent to the exterior of the building. In addition, this also requires a separate means to cool and condense the water vapor. EP 0 753 282 A1 deals with the problem of hot water vapor by cooling and condensing the steam released from the dishwasher. This is accomplished by directing the steam through a heat exchanger through which cold water is circulated. However, this device is limited to applications in which the wash chamber is sealed. Such a device would not work, for example, in a single-stage or multi-stage dishwashing machine open to the atmosphere. EP 0 721 762 A1 teaches the use of a fan to pull the steam into a condensation chamber in order to prevent the escape of moisture to the immediate environment. Of course, this method requires the use of a fan, which adds expense, complexity and noise to the dishwashing apparatus.

Therefore, a need remains for a simple, inexpensive and unobtrusive means for capturing the water vapor released from commercial dishwashers.

SUMMARY OF THE INVENTION

In brief, the invention involves the use of a water spray to create a zone of reduced pressure that can be used to remove heat and humidity and vent the interior of machines such as commercial dishwashers. Preferably, a water spray is used to form a zone of reduced pressure that draws the heat and humidity into the zone. In the zone the heat and humidity is captured and cooled. The hot, highly humid air created within commercial dishwashers can be removed rapidly and the ware can be cooled with ambient air. A cold water spray is used to create a pressure reduction which serves to draw in hot, highly humid air from the dishwasher. The high temperature water vapor cools and condenses on contact with the cold water jet or spray. The invention also serves to help vent the dishwasher and cool ware, as cold, fresh air is drawn into the dishwasher to replace the hot air drawn into the zone of reduced pressure.

Accordingly, the invention is found in a method of removing a heated atmosphere from a machine enclosure, the method comprising energizing a flow of water from a water spray within a housing to create a zone of reduced pressure in the housing in fluid communication between the machine interior and the housing, the reduced pressure introducing fresh atmosphere into the machine while removing the heated atmosphere.

Finally, the invention can also be found in a dishwashing machine, using water of elevated temperature, that can be cooled after completing one or more cycles, the machine comprising a machine enclosure comprising at least one inlet in fluid communication between the machine interior and the machine exterior, and extraction means comprising a housing comprising a water jet and at least one conduit in fluid communication between the machine enclosure interior and the housing, the spray nozzle providing a water spray effective to create a zone of reduced pressure within the housing for removing the hot humid atmosphere from within the machine enclosure while causing entry of fresh air into the machine through the inlet.

The extraction means comprises one or more air inlet means in fluid communication with both the inner compartment of the dishwasher and with a vertical structure comprising a cold water inlet in fluid communication with a spray nozzle. The spray nozzle is located at a horizontal level approximately equal to that of the air inlet means. The spray nozzle provides a high speed water spray suitable to create a venturi effect or a zone of reduced pressure that can serve to pull hot, moisture-laden air through the air inlet means; and an outlet means. For the purpose of this patent application, the term "extraction means" refers to a device that can use a difference in pressure to use the ambient atmospheric pressure to drive the atmosphere within a machine into the area of reduced pressure. The term "nozzle spray angle" connotes the angle, within the spray, bound by the perimeter of the spray as it exits from the nozzle opening. Such angles can typically range from about 5° up to about 180°.

DETAILED DESCRIPTION

The invention generally involves the use of a water spray to create a zone of reduced pressure in fluid communication with the interior of a warewashing machine. The reduced pressure in the zone can draw or vent a heated atmosphere comprising heat and humidity from the interior of machines such as commercial dishwashers. Preferably, a water spray is used to capture and cool the hot, highly humid air created within commercial dishwashers. A cold water spray is used to create a pressure reduction which serves to draw in hot, highly humid air from the dishwasher. Water vapor cools and condenses on contact with the cold water spray within the jet or venturi. The invention also serves to help vent the dishwasher, as cold, fresh air is drawn into the dishwasher as the hot air is drawn out of the dishwasher.

The cold water used to provide the venturi effect is service water from municipal water utilities or wells comprising domestic cold water at or below ambient room temperature. While an operating water temperature range of about 35° F. to about 100° F. is permissible, a range of about 35° F. to about 70° F. is preferred. Obviously, colder water will result in more efficient vapor condensation. While no specific use of the discharge water is required, it is envisioned that it could be used to replenish at least a portion of the wash water needed for subsequent cycles. Alternatively, the discharge water can be sent directly to a drain or sump. As the hot, moisture laden air is drawn out of the machine, cool fresh air is drawn in to replace it. In a simple single stage, batch loading machine, the gaps around the side doors can provide the necessary fresh air. At optimal performance settings, it may be necessary to provide additional air vents. Larger multi-stage machines may also require additional venting in order to provide sufficient cool, fresh air.

The venting venturi does not need to operate continuously. In a batch machine, the operation needs at a minimum to operate for a sufficient time to vent the machine before opening. Generally, it would operate for a period of about 10 to about 60 seconds, preferably about 10 to about 30 seconds during or immediately after the final rinse step but before opening. The venting venturi could optionally operate intermittently as needed to help control air temperature within the dishwasher. In a continuous machine, the system can operate continuously or the system is operated at the end of a stage when heat and humidity are at a maximum.

Dishwashing Machines

A wide variety of dishwashing and warewashing machines can utilize the venting apparatus of the claimed invention. While the figures show a simple batch-loading dishwasher such as the Hobart AM-14, it is envisioned that the venting apparatus of the invention could also be used with larger, multi-stage machines such as the Hobart FLT.

Performance and Equipment Parameters

Figure 2:
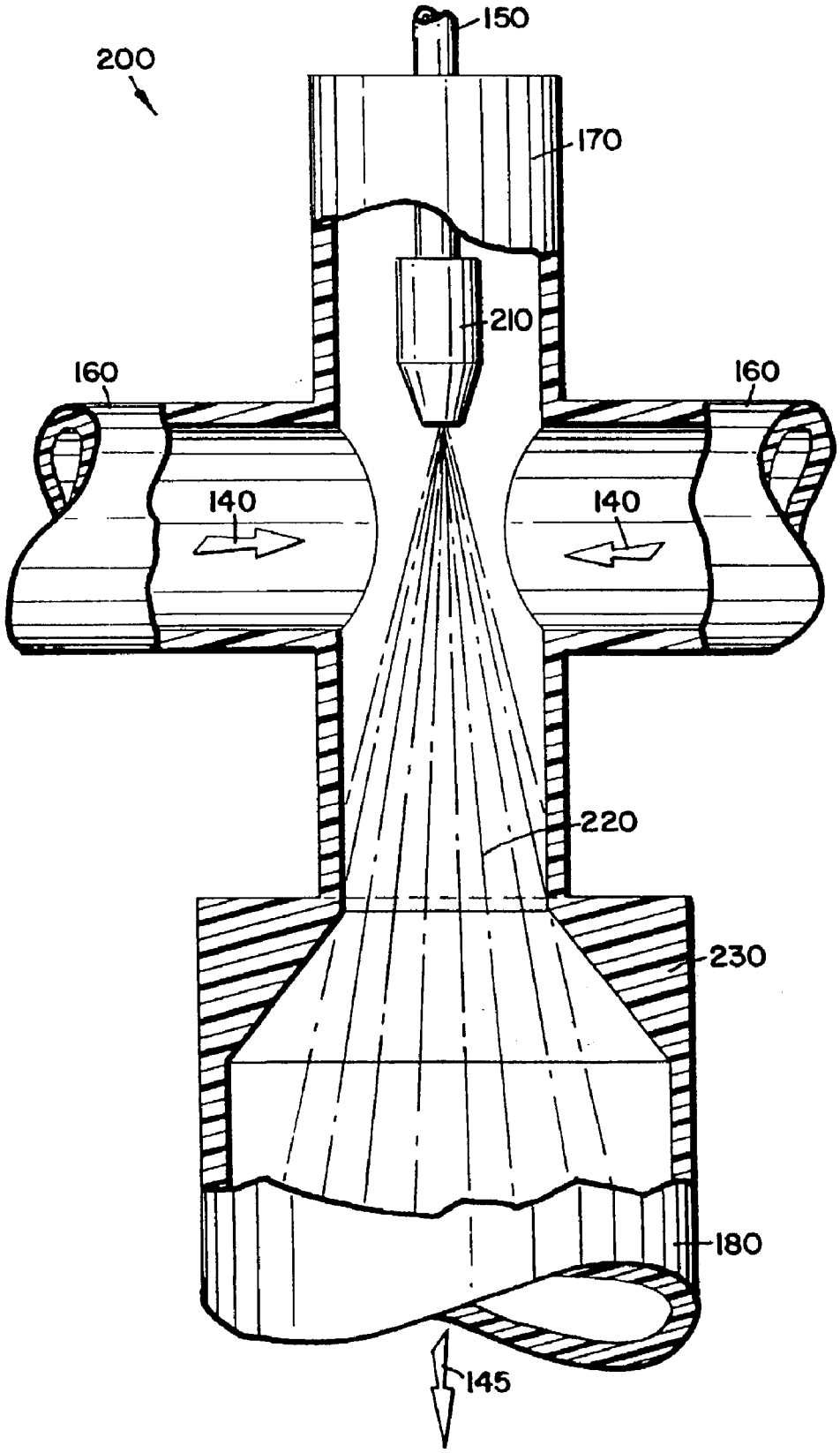
FIG. 2 is a cutaway view of a portion of FIG. 1 which demonstrates the relationships between the air inlet means, water inlet means and air outlet means.

A preferred embodiment is seen in FIG. 2, which shows a venting apparatus attached to a single-stage, batch-loading high temperature dishwashing machine. While a variety of pipe sizes can be used, it has been found that optimal, performance exists when the vertical pipe section has a 2-inch inner diameter (ID) and the discharge pipe has a 3-inch ID The air inlet pipes also are optimally 2-inch ID.

A wide range of spray nozzles could be used in the invention. A wide range of both nozzle angles and flow rates can be used. It has been discovered that nozzles can be used which have nozzle angles ranging from 15° to 50°, but which are preferably about 30°. In any event, the nozzle angle used must be sufficient to permit the water spray to contact the sides of the discharge pipe. Further, the invention can make use of flow rates ranging from about 0.5 to about 10 gallons per minute, preferably about 3 gallons per minute. The water supply pressure can range from about 10 to about 60 pounds per square inch gauge pressure (psig), preferably from about 30 to about 60 psig and more preferably is about 30 psig. It has been found, however, that optimal performance can be obtained using a nozzle with about a 30° spray angle which delivers about 3 gallons per minute at a supply pressure of about 40 psig. This particular nozzle delivers a full-cone spray. The resulting zone of reduced pressure comprises a pressure difference from the ambient pressure of at least about 2 inches of water. The performance parameters of the invention do involve tradeoffs, however. In general it has been found that higher water pressure moves more air, condenses more vapor and is more efficient. However, it has also been found that larger capacity nozzles were able to move more air and condense more vapor. Increasing the capacity of the nozzle drops the water pressure; hence, the tradeoff.

Depending on the supply water temperature, it has been found that the vapor extraction capacity can actually surpass the vapor condensation capacity. The vapor extraction capacity is defined as the amount of water vapor removed from the dishwasher while the vapor condensation capacity is defined as the amount of water vapor actually condensed into a liquid. The vapor extraction efficiency is defined as the volume of air/vapor moved per gallon of water used. The apparatus can possibly extract more hot moisture-laden air than can be condensed. If it is desired to remove all water vapor from the exiting air, it may be necessary to limit the vapor extraction efficiency. In general it was found that the draft created by the water flow was more than sufficient in venting the machine. In fact, it was found that additional vent holes in the dishwashing machine were needed to allow for optimal air flow.

The operation of the method and apparatus of the invention can result in the evacuation of at least about 25 cubic feet of gas or vapor per minute from the interior of the warewashing machine, preferably about 20 to 30 cubic feet can be removed per minute of operation during the practice of the invention. Inside the machine, the temperature of the ware can be reduced from a temperature of greater than about 140 to 170° F., or more, to less than about 120° F. Similarly, the temperature of the enclosed environment within the machine can be reduced from about greater than 140 to 170° F. or more, to less than 120° F. within about 2 minutes during the operation of the machine. The humidity within the operating environment of the interior of the machine can be reduced from a substantially saturated atmosphere (with water vapor) to a humidity approximating the ambient atmosphere within about ½minute of operation of the extraction apparatus and process of the invention.

DETAILED DESCRIPTION OF THE FIGURES

Figure 1:
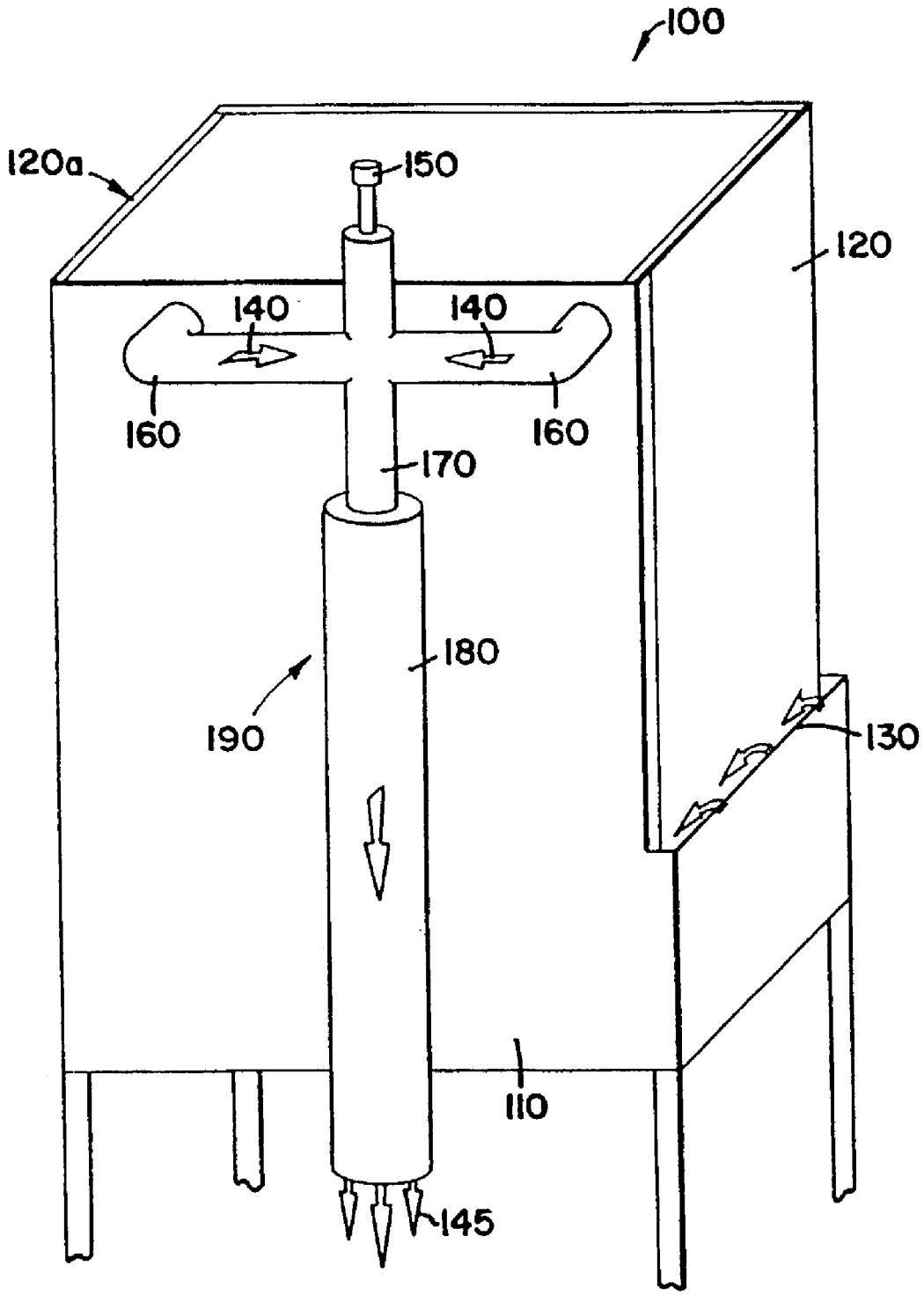
FIG. 1 is a perspective view of a typical batch loading commercial dishwasher showing the apparatus of the invention.

FIG. 1 shows generally a dishwasher 100 typical of the invention. The particular machine pictured is a batch-fill high temperature dishwasher with an enclosing panel 110 and side doors 120 and 120*a*. Mounted to a machine panel 110 is the venting apparatus 190. Visible portions of the venting apparatus 190 include a water inlet means 150, machine vents or heat and humidity conduits 160, vertical pipe section 170 and a discharge pipe 180. Also seen in this figure are cool air inlets 130 which correspond to gaps permitting fluid communication into the machine around the side doors 120. Not shown in this figure are optional venting ports which may be needed, depending on the operational parameters of the dishwasher. Operation of the venting apparatus 190 to remove heat and humidity 140 into a combined stream 145 is better explained using FIG. 2.

FIG. 2 shows a cutaway view 200 generally of the venting apparatus 190. Starting at the top of the figure, a water inlet means 150 is seen, which provides a source of cold water to the spray nozzle 210. The spray nozzle 210 is housed within the vertical pipe section 170, which is in fluid communication with the vents or humidity conduits 160 which in turn are in fluid communication with the internal compartment of the dishwasher 100 (not seen in this figure).

Cold water is supplied to the spray nozzle 210 via water inlet means 150. The high speed spray creates a pressure drop within the vertical pipe section 170, which serves to draw hot, moisture-laden air out of the dishwasher 100 and through the hot air inlets 160 to the vertical pipe section 170. Contact with the cold water spray helps cool and condense the hot water vapor 140, which then exits the venting apparatus 190 through the discharge pipe 180 in a stream 145 comprising service water and condensed humidity. The combined water and condensed vapor can be sent either to a drain sump or to the wash tank (neither seen in this figure).

This figure is intended to display the general idea of the invention and is not meant to define the exact relationship between the spray nozzle 210 and the vent conduits 160. It has been discovered that the spatial relationship between these structures affects the efficiency of the apparatus.

Also seen in FIG. 2 is a transition zone 220, which serves to provide a smooth transition between the vertical pipe section 170 and the larger diameter discharge pipe 180. More importantly, the transition zone 220 and increased diameter discharge pipe 180 serve to control fluid expansion, which increases air flow.

Optimal Pipe Size

While pipe sizes ranging from 1.5 inch ID to 3.0 inch ID were examined, it was found that 2.0 inch ID pipe outperformed both 1.5 and 3.0 inch ID pipes. Optimal performance was found with a combination of a 2.0 inch ID pipe used with a transition to a 3.0 inch ID pipe.

Optimal Spray Nozzle Parameters

Nozzles were examined having spray angles ranging from 15 degrees to 50 degrees. It was discovered that the 30 degree spray angle nozzle had a higher vapor extraction capacity than either of the other nozzles tested.

The nozzles were tested at flow rates ranging from 0.7 to 3.5 gallons per minute. Optimal results were discovered using a flow rate of about 3 gallons per minute at a supply pressure of 40 psig.

The optimal position of the nozzle was observed to be such that the outer most portion of the water spray contacts the inside of the pipe wall just past the air inlet pipe.

The above specification, examples and data provide a complete description of the manufacture and use of the apparatus of the invention. Since many embodiments of the invention can be made without departing from the spirit and scope of the invention, the invention resides in the claims hereinafter appended.

We claim:

1. A dishwashing machine that can be cooled after completing one or more cycles, said machine using water of elevated temperature, said machine producing a hot humid atmosphere, the machine comprising:

(i) a machine enclosure comprising at least one inlet in fluid communication between the machine interior and the machine exterior, and (ii) extraction means comprising a housing comprising a water jet with a spray nozzle, and at least one conduit in fluid communication between the machine enclosure interior and the housing, the spray nozzle providing a water spray effective to create a zone of reduced pressure within the housing for removing the hot humid atmosphere from within the machine enclosure through the conduit, while causing entry of fresh air into the machine through the inlet.

2. The dishwasher of claim 1 wherein the water jet comprises a source of water between about 35° F. and 100° F. and between about 10 and 60 psi.

3. The dishwasher of claim 2 wherein the water jet comprises a source of water between about 35° F. and 70° F. and between about 30 and 60 psi.

4. The dishwasher of claim [3] *1* wherein the water jet comprises a spray nozzle with a spray angle of about 30° and a flow rate of about 3 gallons per minute at a supply pressure of about 40 [psi] *p.s.i.*

5. The dishwasher of claim 1 wherein the housing comprises a 1 to 3 inch ID pipe, the conduit comprises a 1 to 3 inch ID pipe, the housing ending in a discharge section comprising a 1 to 4 inch ID pipe.

6. The [method] *dishwasher* of claim 1 wherein the extraction means [operates] *is configured to operate* for a duration of 10 to 30 seconds at the end of a final rinse period.

7. The [method] *dishwasher* of claim 1 wherein the extraction means [operates] *is configured to operate* intermittently.

8. The [method] *dishwasher* of claim 1 wherein the water jet has a spray angle of at least 15° F.

9. The [method] *dishwasher* of claim 8 wherein the water jet contacts the side walls of the discharge pipe.

10. The [method] *dishwasher* of claim 8 wherein the water jet has a spray angle of between about 15° and 50° F.

11. The [method] *dishwasher* of claim 8 wherein the water jet has a flow rate of between about 0.5 and 10 gallons per minute and a supply pressure of between about 10 and 60 p.s.i.

*12. A dishwashing machine, comprising:*

*an air inlet defined in the dishwashing machine providing fluid communication between a dishwashing machine interior and a dishwashing machine exterior; and*

*a vent in fluid communication with the dishwashing machine interior, the vent comprising a conduit and a spray nozzle constructed and arranged to direct a spray of fluid through the conduit section and create a zone of reduced pressure within the vent so that air and*

*moisture within the dishwashing machine interior is drawn into the vent and ambient air from the dishwashing machine exterior is drawn through the air inlet.*

*13. The dishwashing machine of claim 12 wherein the conduit is a vertical conduit.*

*14. The dishwashing machine of claim 13 wherein spray nozzle is located in a top portion of the vertical conduit.*

*15. The dishwashing machine of claim 12 wherein the air inlet is a gap adjacent to a door of the dishwashing machine.*

*16. The dishwashing machine of claim 12 wherein the vent is configured to operate the spray nozzle intermittently.*

*17. The dishwashing machine of claim 12 wherein the spray nozzle is configured so that the spray of fluid contacts a wall of the conduit.*

*18. The dishwashing machine of claim 12 wherein the spray nozzle is configured to direct the spray of fluid to have a spray angle of at least 15 degrees.*

*19. The dishwashing machine of claim 18 wherein the spray angle is between about 15 degrees and 50 degrees.*

*20. The dishwashing machine of claim 12 wherein the conduit directs fluid from the spray nozzle to a drain outside of the dishwashing machine interior.*

*21. The dishwashing machine of claim 12 wherein the vent is configured to remove gas or vapor from the dishwashing machine interior at a rate of at least about 20 cubic feet per minute.*

*22. The dishwashing machine of claim 12 wherein the vent is configured to reduce the temperature within the dishwashing machine interior by at least about 20 degree F. within about two minutes of operation.*

*23. The dishwashing machine of claim 12 wherein the vent is configured to reduce the humidity within the dishwashing machine interior from substantially saturated to a humidity approximating the humidity in the dishwashing machine exterior within about a half minute of operation.*

*24. The dishwashing machine of claim 12 wherein the zone of reduced pressure comprises a pressure difference from an ambient pressure at the dishwashing machine exterior of at least about 2 inches of water.*

*25. The dishwashing machine of claim 12 wherein the spray nozzle is in fluid communication with a source of fluid at a temperature of between about 35 degree F. and 100 degree F.*

*26. The dishwashing machine of claim 12 wherein the spray nozzle is in fluid communication with a source of fluid at a temperature of between about 35 degree F. and 70 degree F.*

*27. The dishwashing machine of claim 12 wherein the spray nozzle is in fluid communication with a source of fluid with a pressure of about 10 to 60 p.s.i.*

*28. The dishwashing machine of claim 27 wherein the spray nozzle is configured to discharge fluid at a flow rate between about 0.5 and 10 gallons per minute.*

*29. The dishwashing machine of claim 12 wherein the spray nozzle is in fluid communication with a source of fluid with a pressure of about 30 to 60 p.s.i.*

*30. The dishwashing machine of claim 12 wherein the conduit comprises a first pipe section having an inner diameter of about 1 to 3 inches and a second pipe section having an inner diameter of about 1 to 4 inches.*

*31. The dishwashing machine of claim 12 wherein the vent is confirmed to operate the spray nozzle for a duration of about 10 to 30 seconds at the end of a final rinse period.*

*32. A dishwashing machine, comprising:*

*an air inlet defined in the dishwashing machine providing fluid communication between a dishwashing machine interior and a dishwashing machine exterior; and*

*a vent in fluid communication with the dishwashing machine interior, the vent comprising a conduit and a spray nozzle constructed and arranged to direct a spray of fluid to create a zone of reduced pressure within the vent so that air and moisture within the dishwashing machine interior is drawn into the vent and ambient air from the dishwashing machine exterior is drawn through the air inlet.*

*33. The dishwashing machine of claim 32 wherein the spray nozzle is positioned within the conduit and directs a spray of fluid through the conduit.*

*34. A dishwashing machine, comprising:*

*an air inlet defined in the dishwashing machine providing fluid communication between a dishwashing machine interior and a dishwashing machine exterior; and*

*a vent in fluid communication with an interior of the dishwashing machine, the vent comprising a conduit and a spray nozzle constructed and arranged to direct a spray of fluid through the conduit section and create a zone of reduced pressure within the vent so that air and moisture within the dishwashing machine interior is drawn into the vent and ambient air from the dishwashing machine exterior is drawn through the air inlet, wherein the conduit directs fluid from the spray nozzle to a drain outside of the dishwashing machine interior.*

* * * * *